United States Patent [19]

Curchod et al.

[11] 4,267,730
[45] May 19, 1981

[54] WHEEL BALANCING SYSTEM

[75] Inventors: Donald B. Curchod, Saratoga; Hoyt H. Nelson, Santa Clara, both of Calif.

[73] Assignee: Nortron Corporation, Sunnyvale, Calif.

[21] Appl. No.: 939,473

[22] Filed: Sep. 5, 1978

[51] Int. Cl.³ .............................................. G01M 1/22
[52] U.S. Cl. ..................................................... 73/462
[58] Field of Search ................................. 73/462–465, 73/466–467; 364/463, 579, 580

[56] References Cited

U.S. PATENT DOCUMENTS

| | | | |
|---|---|---|---|
| 3,741,016 | 6/1973 | Hofmann | 73/462 |
| 4,046,017 | 9/1977 | Hill | 73/462 |
| 4,068,532 | 1/1978 | Green et al. | 73/462 |

Primary Examiner—James J. Gill
Attorney, Agent, or Firm—Allegretti, Newitt, Witcoff & McAndrews

[57] ABSTRACT

An improved wheel balancing system employs an information entry system with selectable compensation for input of information so that the balancing procedure can be standardized notwithstanding the fact that different styles of wheels are to be balanced.

Means making the selection of compensation includes manually or electrically operated means. In one embodiment the selectively operable compensation means responds to an output from the wheel balancing machine. A zero value is displayed for calculated weights below a predetermined minimum in response to the output from the balancing machine.

17 Claims, 10 Drawing Figures

FIG-3

FIG_5

WHEEL BALANCING SYSTEM

BACKGROUND OF THE INVENTION

This invention pertains to wheel balancing systems and machines and more particularly to such a system having means for selectively modifying input data measured in a manner pertinent to one style of wheel to cause the data to be pertinent to another style of wheel.

In known machines for balancing vehicles wheels balance equations are solved based on known input data. Such data includes, among other things, the radius or diameter of the rotational path of weights attached to the wheel as well as the spacing between parallel planes defined by and including the rotational paths of the inner and outer weights. Since wheel weights are typically clipped to the edge of the inner and outer rims, the diameter of the rotating paths corresponds substantially to the wheel diameter. Also, the spacing between the planes defined by the rotating weights corresponds substantially to the spacing between the rims. Thus, the above data as to diameter of the path of each weight as well as the spacing between the planes thereof can be easily obtained by an operator by merely noting the stated wheel diameter and by measuring the distance between the rims using calipers or other means.

The above correlation between the location of the weights and rim diameter and spacing does not pertain to certain popular styles of wheels, such as wire spoke wheels or aluminum alloy wheels (all referred to hereinafter as "mag" wheels) since the weights are not clipped to the edge of the rims. Thus, entry of data by following the above simple procedure based on indicated wheel diameter and measured spacing between rims would provide incorrect results. Thus, another balancing procedure has had to be employed for wheels (such as "mag" wheels) where the weights are not carried by the edge of the rims.

Thus, in the past, the balancing of "mag" wheels has required the operator to attempt to measure the actual spacing between the planes defined by rotational movement of the weights as well as to estimate the radii of the rotational paths of each weight to provide data for the system. By imposing different measuring and information collecting procedures upon the operator based upon balancing of conventional steel wheels or "mag" wheels, the chances for entry of erroneous data is believed to be significantly increased.

The system as disclosed herein permits the operator to pursue the same routine for "mag" wheels as is pursued for steel wheels except that when balancing "mag" wheels a control element is initially activated to operate means for converting readings taken in a manner as though the wheel were a standard wheel to data pertaining to "mag" wheels.

It has been observed that the mounting of certain minimal amounts of weight to a wheel for purposes of attempting to balance the wheel may be substantially ineffective for most practical purposes. Accordingly, means have been provided according to one embodiment herein for displaying zero weight when, in fact, an amount of weight below a given minimum may actually have been calculated by the balancing system. Accordingly, means are provided for blanking out these sub-minimum weight values as a matter of convenience by displaying zero weight instead. According to one embodiment of the invention means are provided for selectively establishing one of a plurality of minimum weight levels based on the magnitude of one of the input parameters inasmuch as the value of minimum weight will vary with the value of at least one of the input parameters to the system.

As noted above, in balancing a "mag" wheel with the system as disclosed herein a control element may be initially activated in order to operate means for modifying the values of readings taken in a manner as though the wheel were a standard steel wheel so that the input information for mag wheels can be obtained from the same locations as the wheel as used for standard steel wheels. The foregoing style of system is rendered possible by virtue of the fact that a substantial majority of "mag" wheels have substantially the same characteristics. However, there are additional classes of "mag" wheels which do not conform to the characteristics of the majority and, accordingly, in accordance with another embodiment of the invention, means are provided for selectively modifying the input information in accordance with one of a plurality of different classes of "mag" wheels.

Figure 2:
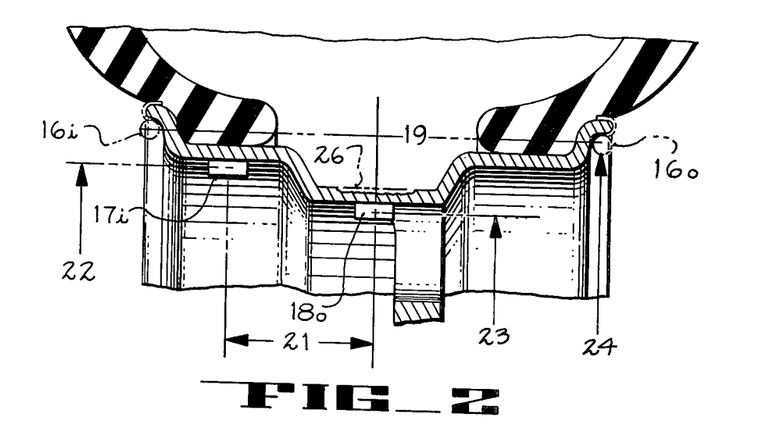
FIG. 2 shows a transverse section taken through an aluminum wheel with weights located thereon and further showing the usual position of conventional weights when attached to the edges of a wheel.

Typically, weights applied to a "mag" wheel are disposed more closely together and are arranged to travel rotationally in paths having mutually different diameters each less than that of weights employed on standard steel wheels. As shown in FIG. 2 conventional wheel weights 16 are shown in phanthom lines positioned at the edge of the inner and outer rims of a "mag" wheel. The foregoing attachment, as is known, is unsatisfactory. Accordingly, a different style of weight is employed which is adhesively attached to the surface of the wheel in a position as closely approximating that of wheel weights 16 as possible but without being exposed to view from a position located at the side of a vehicle having such wheels. Thus, both weights are usually disposed on the back side of the "mag" wheels, i.e. the inner side, so as not to affect the appearance of the wheel.

As shown in FIG. 2, inner and outer "mag" wheel weights 17, 18 are shown in position. From inspection of FIG. 2 it is evident that the spacing 19 normally established for conventional wheel weights 16 is substantially greater than the spacing 21 between wheel weights 17, 18. In addition, the diameter 22 of the rotational path of weight 17 and diameter 23 of the path of weight 18 are each less than the path diameter 24 of conventional weights 16. In order to simplify entry of information into the system described herein a mean diameter 26 representing the average between diameters 22 and 23 can be substantially used for both.

Thus, by employing a set of correction factors based on a predetermined relationship between "mag" wheels and related sizes of standard steel wheels, measurement of spacing 19 between the rim edges (and hence substantially between weights 16) can be converted to spacing 21. Also, when using the correction factors, the diameter 24 of the rotational path of a standard weight 16 becomes coverted to the mean diameter 26 for "mag" wheel weights $17_i$ and $18_o$. The "a" dimension will also be modified.

Figures 1, 4:
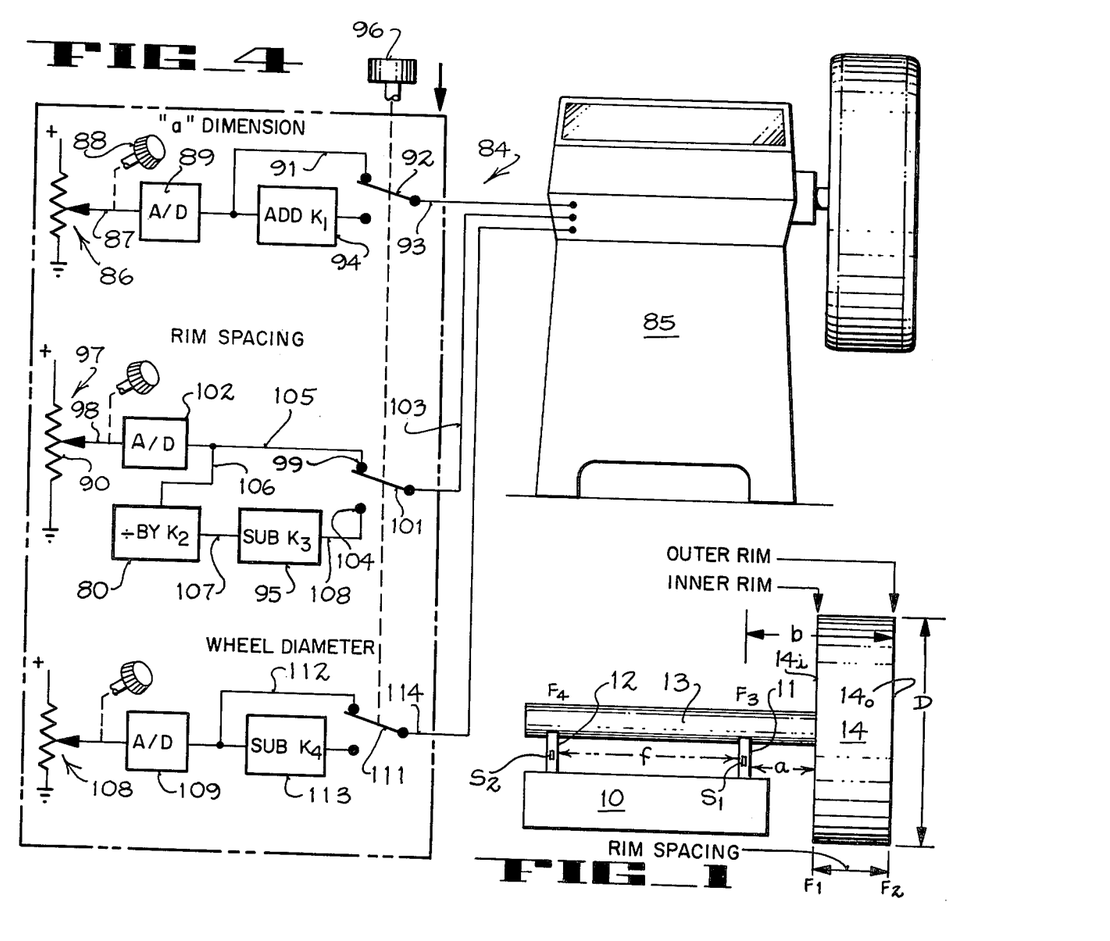
FIG. 1 shows a diagram for explaining a portion of the derivation of the appropriate weights to be added to a wheel 14.
FIG. 4 shows another embodiment of a balancing machine and system according to the invention.

Typical known machines for dynamically balancing vehicle wheels serve to compute an amount of weight to be added to the edge of the inner and outer rims of a wheel. These machines also compute the peripheral location on each rim for locating each weight. In computing the amount of weight to be attached, moments are compared in various known ways and at various times. For illustration, the diagram of FIG. 1 shows certain momentary force conditions for developing a portion of the data to be employed by a balancing machine in solving equations. An example of one type of equation is shown for summing the moments to zero about $F_1$ and $F_2$ as in (1) and (2) respectively, below.

$$-F_2(b-a)+F_3a+F_4(a+f)=\phi \quad (1)$$

$$F_1(b-a)+F_3b+F_4(b+f)=\phi \quad (2)$$

From a consideration of each of these equations it will be evident that physical measurement of the spacing (b−a) between the rims and physical measurement of the "a" dimension, as by means described below, provides all of the variable input data which is necessary for an operator to supply in order to solve each of the above equations. The remaining data remains fixed and is provided by the machine.

Note, for example, that physical measurement of the "a" dimension combined with measurement of the spacing between the rims of a wheel, as by means of calipers or other means serves to provide the "b" dimension. Accordingly, the quantity (b−a) provides a value corresponding to the spacing between the rims of the wheel.

The diagram shown in FIG. 1 represents a known balancing machine provided with a support base 10 with supports 11, 12 extending upwardly to hold a bearing housing 13 thereon. Bearing housing 13 includes a rotatable shaft therein (not shown) supporting a wheel and tire assembly 14 at the right hand end thereof so that the wheel and tire assembly 14 can be rotated by motor means (not shown) coupled to drive the shaft.

As arranged in one construction the movement of bearing housing 13 is limited to a plane normal to the plane of the paper and including the axis of housing 13. Such movement causes sensors $s_1$ and $s_2$ carried on supports 11, 12 to be activated so as to provide an indication of the forces $F_3$, $F_4$ acting thereon.

The rim diameter, D, constitutes a third entry to be made by the operator based on inspection of the wheel size. Thus, the forces $F_3$, $F_4$ are detected by sensors $s_1$, $s_2$ respectively. Forces $F_1$, $F_2$ can readily be determined by conversion of equations (1) and (2) to the following relations:

$$-F_1=[F_3b+F_4(b+f)]/(b-a) \quad (3)$$

$$F_2=[F_3a+F_4(a+f)]/(b-a) \quad (4)$$

The amount of counterbalancing weight to be added to inner rim $14_i$ and to outer rim $14_o$ to overcome the forces $F_1$ to $F_2$ respectively is known to be inversely proportional to the diameter of the rotational path of such counterbalancing weight and can be represented by equations (5) and (6) where D=the diameter of each rim $14_i$, $14_o$ and K is a constant:

$$W_{t1}=(-F_1/D)\times K \quad (5)$$

$$W_{t2}=(-F_2/D)\times K \quad (6)$$

Accordingly, the conversion from a determination of forces $F_1$, $F_2$ to weights $W_1$, $W_2$ to be added to the rims is relatively simply computed.

SUMMARY OF THE INVENTION AND OBJECTS

In general, a wheel balancing system of a type for computing the amount of counterbalancing weight to be added to a wheel in each of two spaced parallel planes defined by rotation of the weights with the wheel has been combined with an information entry system having means for selectable compensation of input information. Accordingly, a plurality of variable input means provides signals representative of the value of input information relative to the rotational paths of weights to be carried by the wheel when the input information is derived in a predetermined manner for a first style of wheel. Means are also provided for selectively modifying the signals to become representative of different values for the same relationships for the rotational paths. Thus, the latter information though obtained initially in the same manner as the first, becomes relative to a second and different style of wheel.

The last named means (though operable manually in one embodiment) preferably operates in response to a signal from the wheel balancing machine representative of completion of a first calculation as to the weight to be added to a steel wheel. Further, means for blanking out calculated values of weights falling below a predetermined minimum when using steel wheel inputs for balancing a "mag" wheel serves to blank out computed values of weight for "mag" wheels regardless of such computed value.

In general, it is an object of the present invention to provide an improved wheel balancing system characterized by a novel information entry system with selectable compensation for input information so that the balancing procedure can be standardized notwithstanding the fact that different styles of wheels are employed.

It is another object of the present invention to provide a system whereby measurement information taken at a common location on each of a plurality of different types of wheels can be readily modified so as to provide a proper input value for entry into a balancing machine.

Yet another object of the invention is to provide a balancing system having means for blanking out calculated values of weight below a practicable amount, the last named amount varying in response to physical characteristics of the wheel being balanced.

The foregoing and other objects of the invention shall become more readily evident from the following detailed description of preferred embodiments when considered in conjunction with the drawings.

BRIEF DESCRIPTION OF THE DRAWINGS

FIG. 6 shows a schematic diagram of a system according to another embodiment of the invention;

FIG. 8 shows a variation of a portion of the system of FIG. 7;

FIG. 9 shows a schematic block diagram of a system according to another embodiment of the invention.

DETAILED DESCRIPTION OF PREFERRED EMBODIMENTS

Figure 3:
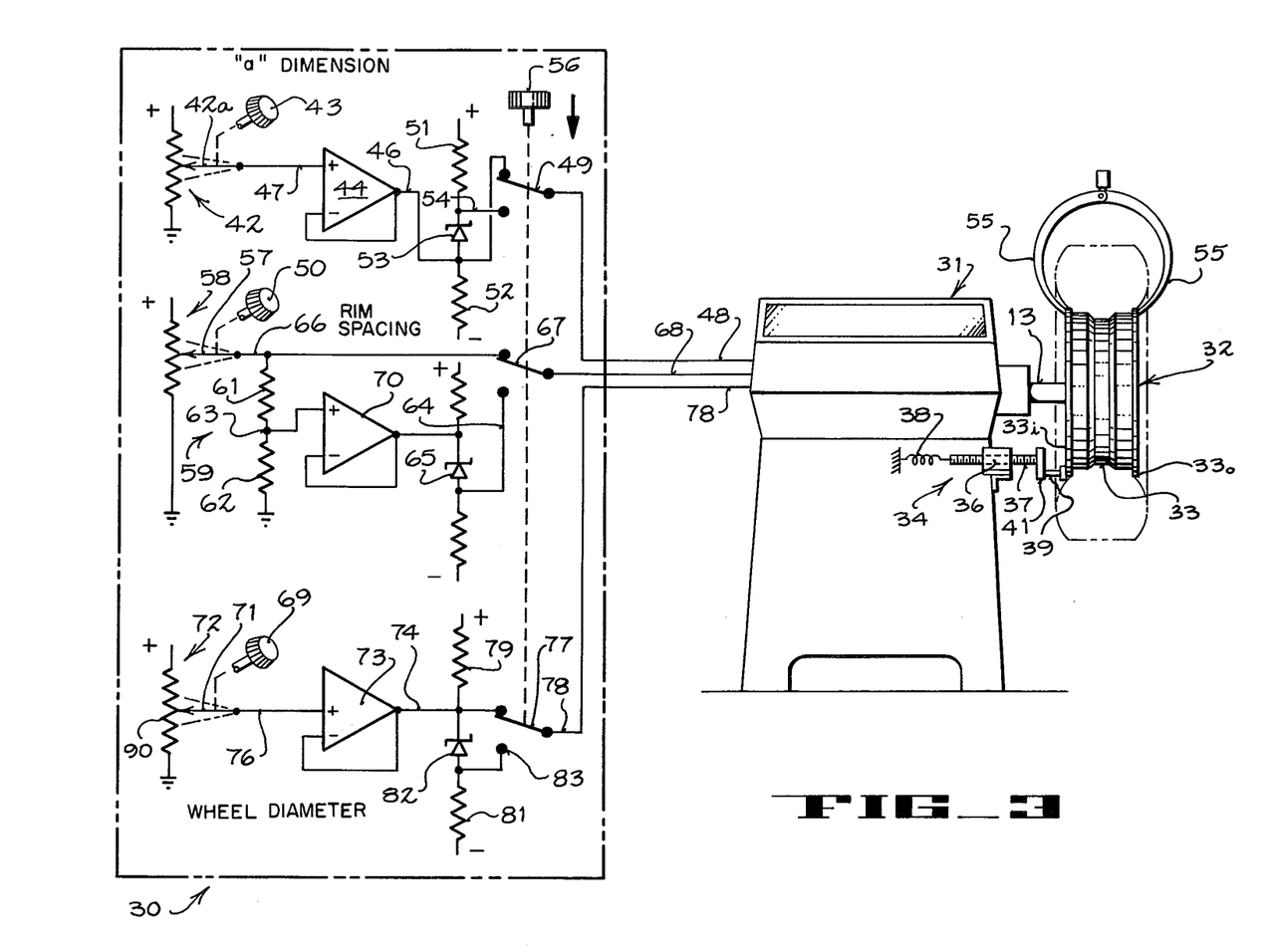
FIG. 3 shows a schematic diagram of a system according to the invention.

Balancing system 30 includes balancing machine 31 of known construction utilizing input data such as Wheel Diameter, Rim Spacing, the "a" dimension, or various combinations of such data for computing the amount of counterbalancing weight.

Machine 31 is arranged to carry a wheel assembly 32 fixed to the distal end of a driven axle (not shown) carried axially within a bearing housing 13. Machines 31 of the kind described serve to generate information as to the amount of counterbalancing weight to be added in each of two spaced parallel planes taken through the weights and defined by rotation of the weights with dynamically unbalanced wheels.

In carrying out the procedures for determining the amount of counterbalancing weight to be added in each of the two planes, information must be obtained by the operator and entered into machine 31. Thus, the operator of the system needs to know the diameter of the wheel 33 and the spacing 19 between the location of weights to be added as described above with respect to the standard inner and outer wheel weights $16_i$ and $16_o$ respectively. The spacing 21 between adhesively applied "inner" and "outer" weights $17_i$, $18_o$ employed with "mag" wheels is known to the modification portion of the balancing machine as described below.

In addition, the displacement of the planes of the weights with respect to the position of sensors needs to be known and as described herein one such relationship has been referred to as the "a" dimension (FIG. 1).

Accordingly, an inner rim gauge 34 (FIG. 3) has been diagrammatically shown including a fixed, annular guide 36 for supporting an indicator rod 37 axially movable therethrough. A spring 38 secured at one end to a fixed portion of the machine and at the other end to an end of rod 37 serves to urge rod 37 leftwardly as shown in the drawing. Rod 37 includes a number of scribe marks for indicating the degree to which it has been drawn to the right. Rod 37 provides a direct reading of the "a" dimension when the distal end of a protruding stud 39 carried by a pivot arm 41 engages the inner rim $31_i$. Pivot arm 41 serves to accommodate wheels of different diameter.

Having measured the "a" dimension, the operator employs variable means controllable by the operator to provide a first input signal substantially representative of the moment arm defined between the inner rim of a wheel carried on an axle and the nearest point of support for the axle carried by the balancing system.

Thus, means such as a potentiometer 42 having a wiper 42a controllable by the movement of a knob 43 serves to provide a first input signal which is substantially representative of the "a" dimension as described with respect to FIG. 1. An operational amplifier 44 may be disposed in the input line whereby the voltage at the output 46 will faithfully provide the signal as at the input 47.

Means for coupling the value of the output at 46 directly into balancing machine 31 via input lead 48 comprises one position of the two position switch 49.

Means for adjusting the value of the "a" dimension signal by a predetermined relationship so as to provide a second input signal substantially representative of the length of a moment arm having a different extend from the moment arm established with respect to a conventional steel wheel 33 includes a zener diode 53 disposed between resistors 51, 52. A lead 54 extends to a second contact point of switch 49 whereby upon downward movement of control element or button 56, switch 49 will couple to lead 54 whereby the signal from output 46 will be increased by the amount of the voltage across diode 53. This modified signal representative of a modified "a" dimension is then fed by input lead 48 into machine 31.

As noted above, the spacing between the inner and outer rims $31_i$, $33_o$ serves to substantially provide an indication of the spacing between planes defined by the rotating weights. Hence, by suitable means such as calipers 55 the rim spacing of a conventional steel wheel 33 can be supplied to balancing machine 31 by means as now to be described.

Variable means such as the knob 50 coupled to operate wiper 57 of potentiometer 58 provides a first input signal substantially representative of the spacing between the rims of "mag" wheel 33.

Means for adjusting the value of this input signal by a predetermined relationship so as to provide a second input signal substantially representative of the spacing between the planes defined by the rotating weights on a wheel wherein the latter spacing is less than the spacing between the rims includes a voltage divider 59. Divider 59 consists of resistors 61 and 62, for providing a proportionate adjustment to the signal from wiper 57. Then, to apply a fine correction in a fixed amount the modified signal is directed through a zener diode 65 via operational amplifier 70. The output from zener diode 65 is coupled via lead 64 to an associated switch point. This subtraction of voltage modifies the value of the input signal (on 66) by a predetermined relationship to provide a second input signal via lead 64. The latter input signal therefore substantially represents the spacing between the planes of the weights and having a value less than the first named spacing.

Means for selectively coupling the first or second input signals from lead 66 or 64 to balancing system 31 for computing the value of weight to be added in the spaced parallel planes comprises a switch 67 ganged together with switches 49 and 77 to be operated by a control element, such as button 56. Switch 67 is directly coupled to input lead 68 for entry of information therefrom into balancing machine 31. The function of button 56 is carried out in an automatic mode in another embodiment as explained below.

Variable means such as a knob 69 and wiper 71 of potentiometer 72 controllable by an operator provide a first input signal substantially representative of the diameter of the rim of wheel 33. An operational amplifier 73 provides a low impedance output signal at 74 having the same value as at input 76. As thus arranged a first input signal representative of the diameter of wheel 33 can be supplied to balancing machine 31 directly via switch 77 and input lead 78.

Means for adjusting the value of the above signals by a predetermined relationship serves to provide a second input signal substantially representative of the diameter of the rotational paths of the weights such as 17, 18 of FIG. 2 carried by a different style of wheel to be balanced in which the diameter of the rotational path of the balancing weights is less than the diameter of the rotational path defined by weights attached to the rim of a wheel.

Accordingly, a circuit comprising resistors 79, 81 and a zener diode 82 are arranged whereby the voltage drop across diode 82 is subtracted from the signal at output 74 so as to modify the output by a predetermined relationship providing a second (or modified) signal appearing at contact point 83. The signal appearing at 83 therefore is modified to be substantially representative of the diameter of the rotational path of weights 17, 18 carried by a different style of wheel to be balanced, the last named diameter being less than the first named diameter in the present application.

Switch 77 controlled by button 56 selectively couples a first or second input signal from output 74 or contact 83 to balancing machine 31 for computing in known manner the value of weights to be added to travel a rotational path having the first or second diameter. From inspection in FIG. 2 it will be readily evident that the average diameter 26 of the rotational paths of weights 17, 18 is less than diameter 24 for conventional weights 16. Accordingly, as shown in FIG. 3 the voltage drop across diode 82 lowers the voltage of the signal otherwise appearing on line 74 by a predetermined amount to provide a lesser voltage at 83 representative of the lesser diameter 26.

It is to be understood that each of knobs 43, 50, 69 have been calibrated against a scale (not shown) representative of a linear measure with respect to a standard steel wheel (since measurements are being taken as though the "mag" wheel were a standard steel wheel).

Before operation each of the knobs 43, 50, 69 is set, then button 56 is depressed to transfer switches 49, 67 and 77, respectively, for entering modified signals into the balancing machine inputs. In this way button 56 can serve to enter all compensations simultaneously for use by balancing machine 31 even though all of the measurements have been taken as though the wheel were a standard steel wheel.

According to another embodiment of the invention, as shown in FIG. 4, an information entry system 84 provides digital information to a wheel balancing machine.

With respect to the "a" dimension a potentiometer 86 includes a movable wiper 87 controlled by the manually operated knob 88. Accordingly, an analog signal substantially representative of the linear measurement of the "a" dimension is directly coupled to an analog to digital converter 89. A lead 92 directly coupled to the output of converter 89 serves to supply a digital representation of the "a" dimension to balancing machine 85 via switch 92 and lead 93. The foregoing input to machine 85 pertains to the balancing of a standard style steel wheel.

As noted above, however, when different styles of wheels are to be balanced the "a" dimension may change. Accordingly, means for adding a compensating constant is shown at 94 whereby when the "mag" start button 96 has been depressed to transfer switch 92 to the output of means 94 the digital input thereto from converter 89 will be modified to provide an adjusted input for balancing machine 85 via lead 93.

With respect to selectively entering digital data pertinent to rim spacing (i.e. spacing between the planes defined by rotation of the weights) the output from potentiometer 97 via the manually controlled wiper 98 leads via an analog to digital converter 102 and lead 105 directly to a switch contact point 99 which, via switch 101, supplies a digital input on lead 103 to balancing machine 85. In the event that a "mag" wheel is to be balanced, switch 101 is transferred by means of the "mag" start button 96 to a second contact point 104.

Thus, the output from converter 102 is fed via lead 106 to a digital division circuit 80 to divide by a constant $k_2$ and then to a subtraction circuit 95 to subtract the constant $k_3$ whereby the modifified output appears on lead 108 coupled to point 104. A reduced voltage, of course, is consistent with the fact that the weights of "mag" wheels are disposed more closely together (note the dimension 21 of FIG. 2) than the spacing between the planes of the paths of weights carried by standard steel wheels.

Finally with respect to wheel diameter, an analog value derived from potentiometer 108 is supplied to an analog to digital convertor 109 to provide a digital output to switch 111 either directly via lead 112 or via means 113 for digitally subtracting a constant value from the input value thereto.

Accordingly, the digital signal on input lead 114 provides a digital representation of the wheel diameter of a standard wheel via lead 112 or a "mag" wheel or other style wheel via means 113.

Finally, it is to be noted that each of the input leads 93, 103, 114 are to be coupled to a suitable digitally operative wheel balancing machine as represented at 85.

From the foregoing it will be readily evident that there has been provided an improved wheel balancing system characterized by an improved information entry system with selectively employable compensation of input information obtained in a simple manner for wheels disposing weights in different relationships with respect to the manner of obtaining information thereabout. The foregoing system is particularly useful in determining information about weights to be applied to so-called "mag" wheels whereby measurement of the spacing between the rims can be converted to a more accurate measurement of the spacing defined between the weights carried by a "mag" wheel; the wheel diameter will be adjusted to compensate for the difference in diameter of the rotational paths of the weights relative to the standard positioning of the weights on the edge of the rims; and the "a" dimension will be adjusted to compensate for the fact that the weights are not carried at the edges of the rims but are located between the rims. Accordingly, the proper "a" dimension for a "mag" wheel can be achieved even though the measurement is taken from the adjacent rim.

Yet another embodiment of the invention is shown in FIG. 6. It has been observed that certain "mag" wheels may not be within the pattern of the majority so that they do not conform to the predetermined relationship generally relied upon for making the foregoing conversions. Accordingly, a data input system 130 serves to provide selective modification of the input signal in each of two stages whereby supplemental modification of the input signal can be provided for such wheels as do not lie within the common pattern.

It is anticipated that one practical application of this embodiment is to employ a number of control buttons 116, each with its own unique circuit of the type described whereby each button 116 can be associated with a given non-conforming wheel. Then when such a wheel is to be balanced the operator will merely employ the appropriate button 116. Accordingly, only a single supplementary signal modification section 135 is shown though representative of a plurality of such sections.

As shown in FIG. 6, Section 135 includes a control element or button 116 coupled to operate a plurality of switches 117, 118, 119 between first and second positions. The first position as shown serves to by-pass any additional modification of the original input signal.

However, by depressing control element 116 downwardly to transfer switches 117–119, connection is made in each instance to circuits comparable to those previously described having values whereby the original input signal is additionally modified prior to entry into balance machine 31 via leads 48, 68, 78.

For example, as noted above, with regard to the "a" dimension, the output from switch 49 can be traced via lead 121 to switch 117. In the position shown for switch 117 the signals will remain unmodified and provide an input to machine 31 via lead 48.

In addition, a zener diode 122 interposed between resistors 123, 124 serves to increase the voltage at the other contact point of switch 117 (associated with lead 126) as compared to the voltage on lead 121.

As thus arranged either of the control elements or push buttons 56, 116 can be depressed to modify an input signal. Normally, it is contemplated that a button 56 will be depressed to provide the basic correction to the input signal and button 116 will be employed to provide supplemental modification of the signal as desired for specific types of wheels.

Means for selectively modifying signals representative of the rim spacing parameter in addition to an initial modification thereto previously explained comprises a supplemental circuit traced from switch 67 (in whichever position it may be) to input line 68 via a lead 127 directly coupled to a switch point for switch 118. To introduce supplemental modification to the output signal from switch 67 a voltage divider comprising resistors 128, 129 provides an intermediate point to which an operational amplifier 131 is coupled. The output of amplifier 131 is fed through a zener diode 132 to an output lead 133 whereby the voltage from switch 67 will be proportionately reduced by resistor 128 and then reduced by a predetermined amount by zener diode 132 to appear at the switch contact point associated with lead 133.

Means for selectively modifying the input signals for wheel diameter in one or two stages so as to accommodate certain "mag" wheels, is arranged whereby the output from switch 77 is directly coupled to a switch contact point for switch 119. The second switch contact point is associated with a lead 134 whereby a signal from switch 77 passes via lead 136 through a zener diode 137 thereby causing a specific voltage drop in the signal from lead 136.

The foregoing embodiment, accordingly, serves to provide selective compensation in each of two stages so as to accommodate balancing of additional classes of "mag" wheels.

Further, the foregoing arrangement can readily provide appropriate modification of the input signals from potentiometers 42, 58, 72 for each of three styles of wheels different from standard steel wheels simply by depressing switch 56 or 116 or both thereby providing three different modifications of the measured input signal so as to accommodate three different classes of "mag" wheels or otherwise.

Figures 7, 10, 11:
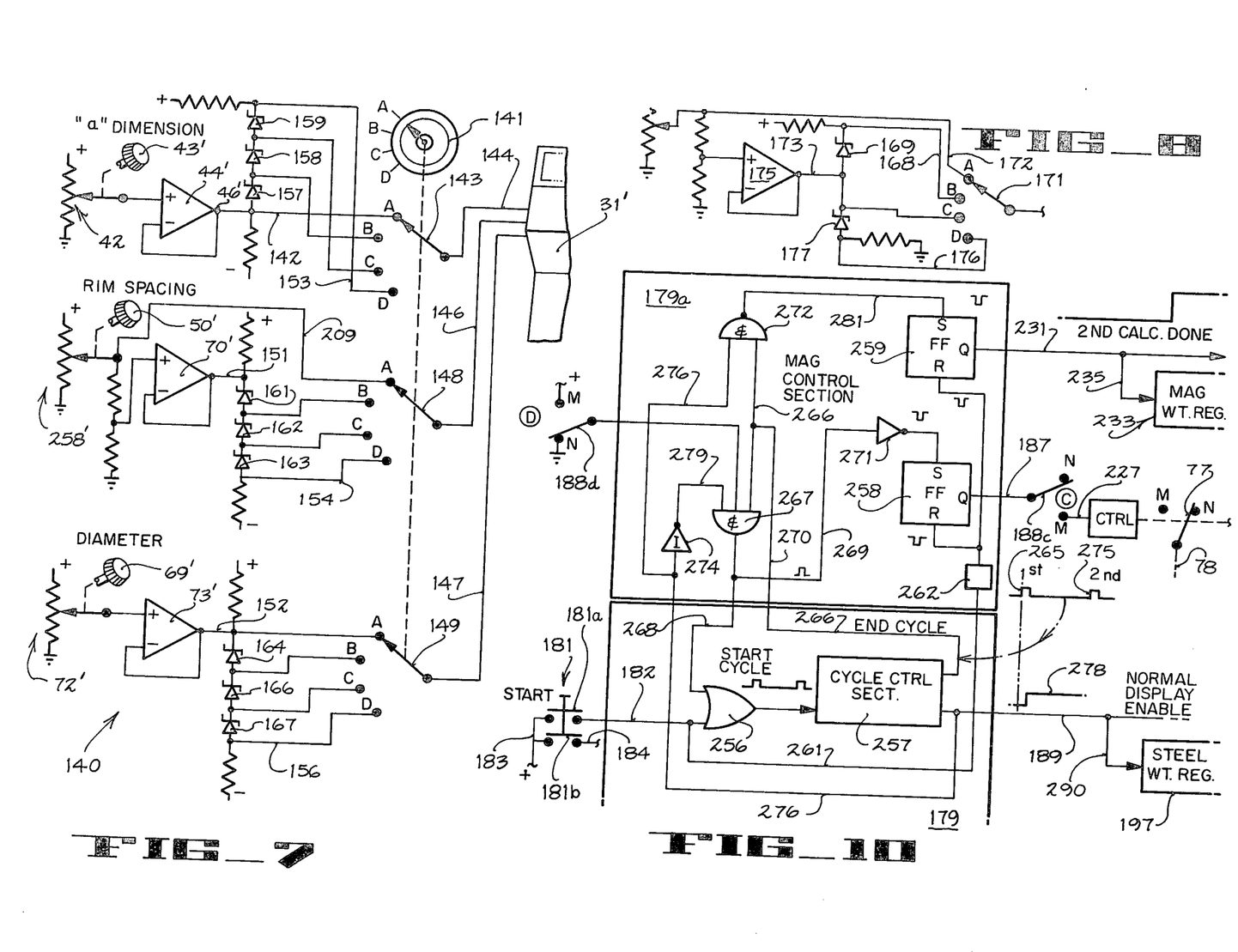
FIG. 7 shows a schematic diagram of an information input system according to yet another embodiment according to the invention.
FIG. 10 shows a schematic diagram of a portion of system shown in FIGS. 5 and 9.

According to another embodiment of the invention as shown in FIG. 7, means for modifying the measured input information according to a selected one of several switch positions comprises structure as now to be described.

As a convention in system 140 (FIG. 7) a prime mark (') has been added to elements of information input system 130 (or other preceding embodiment where the function of such element has been previously described).

Accordingly, knobs 43, 50, 69 are each designated as 43', 50', 69', respectively, for operating potentiometers 42', 58' and 72' to supply signals representative of the balancing parameters such as the "a" dimension, rim spacing and diameter, respectively, as taken from the wheel in a conventional manner.

With respect to the "a" dimension the output of operational amplifier 44' is selectively coupled to a wheel balancing machine 31' via a selected one of four channels (A, B, C, D) established by the position of the channel selector 141. In the position shown, channel selector 141 is arranged to couple the "a" channel directly through to the wheel balancing machine 31' via a path traced from operational amplifier 41' along lead 142 to a switch armature 143 coupled to input lead 144. Similarly an input is supplied to balancing machine 31' via input leads 146, 147 via associated switch armatures 148, 149 ganged together with switch armature 143 and channel selector 141 so that all three of the switch armatures will be disposed in association with a given channel at the same time.

For the Rim Spacing input the output of potentiometer 258' is fed directly via lead 209 to the "a" contact point of switch 148. For contact points "b", "c" and "d" the output of potentiometer 58' is directed via lead 151 of an operational amplifier 70' to pass through one, two or three zener diodes 161, 162, 163 depending upon the selection made at switch 148.

In the case of corrections to signals for Rim Spacing and Diameter values are to be subtracted from the original inputs. It has been observed that as channel selector 141 moves from one channel to the next for balancing different classes or types of wheel, the network of zener diodes and the associated control switch can be arranged as shown in FIG. 8 wherein the A channel provides a direct unmodified readout as though a steel wheel were being balanced, following the procedure of the foregoing embodiments. However upon moving to the B channel an increase in the level of voltage may be registered via lead 168 and zener 169. Then as switch armature 171 moves to the C channel point, the output from operational amplifier 175 becomes coupled directly to switch 171 to provide a proportionately reduced signal from that at the "a" contact.

A reduction in the voltage from lead 173 occurs by moving switch armature 171 to the D channel contact point associated with lead 176 whereby zener diode 177 subtracts a predetermined voltage from the signal on lead 173.

Typically, weights computed for a given "mag" wheel will be greater than weights computed for a given steel wheel due to the smaller diameter of the rotational path of the weight on the "mag" wheel. The weight will also tend to be greater due to the typically reduced spacing between the planes of the paths of the balance weights (FIG. 2).

It has been observed that in the balancing of a wheel there becomes a point of dimishing return with respect to adding very small weights. Thus, when balancing a given steel wheel a predetermined minimum weight may be stored in the balancing machine whereby when the balancing machine calculates that less than the minimum weight is to be added to the wheel the display will be instructed to indicate that no weight is to be added to the wheel.

It has been discloveried that such sub-minimum weight computation for a steel wheel can be used to indicate the existence of sub-minimum weight for a "mag" wheel even though the sub-minimum weight for a "mag" wheel may be greater than the sub-minimum weight computed for the same wheel using steel wheel input information. Thus, means are shown in system 180 (FIG. 5) for detecting such sub-minimum weight conditions for a "mag" wheel derived from the parameters for the "a" dimension, rim spacing and wheel diameter measured as though the wheel being balanced were a steel wheel.

Accordingly, it has been observed that if a "mag" wheel is placed upon a balancing machine and weight to be added is computed as though the wheel were a standard steel wheel (where weights can be clipped to the rims and the diameter of the rotational path of weight increased accordingly as in FIG. 2), a minimum weight can be pre-established so that whenever the computed weight falls below the pre-established weight the read-out will show zero weight. By using the relationship described above, the display will indicate zero weight to be added to the "mag" wheel whenever the computed weight (using steel wheel input information) is less than a predetermined minimum weight, even though the computed weight for the "mag" wheel may sometimes actually be relatively large. Thus, for "mag" wheels the display can show the need to add a relatively large weight (compared to the amount of minimum weight used by steel wheels) and yet this seemingly large weight as computed may lie below the predetermined minimum weight needed to be effective for commercial, industrial or private usage of the "mag" wheel. This fact has often lead operators to strive to balance a wheel more precisely than is necessary for most practical industrial and commercial usage notwithstanding indication by the machine that weight should be added.

As herein used the term "zero balance weight" pertains to a predetermined minimum amount of weight less than which, when applied to an unbalanced wheel will contribute little, if anything, to balancing the wheel, in the usual circumstances, and at which point the display will be instructed to show zero weight.

Figure 5:
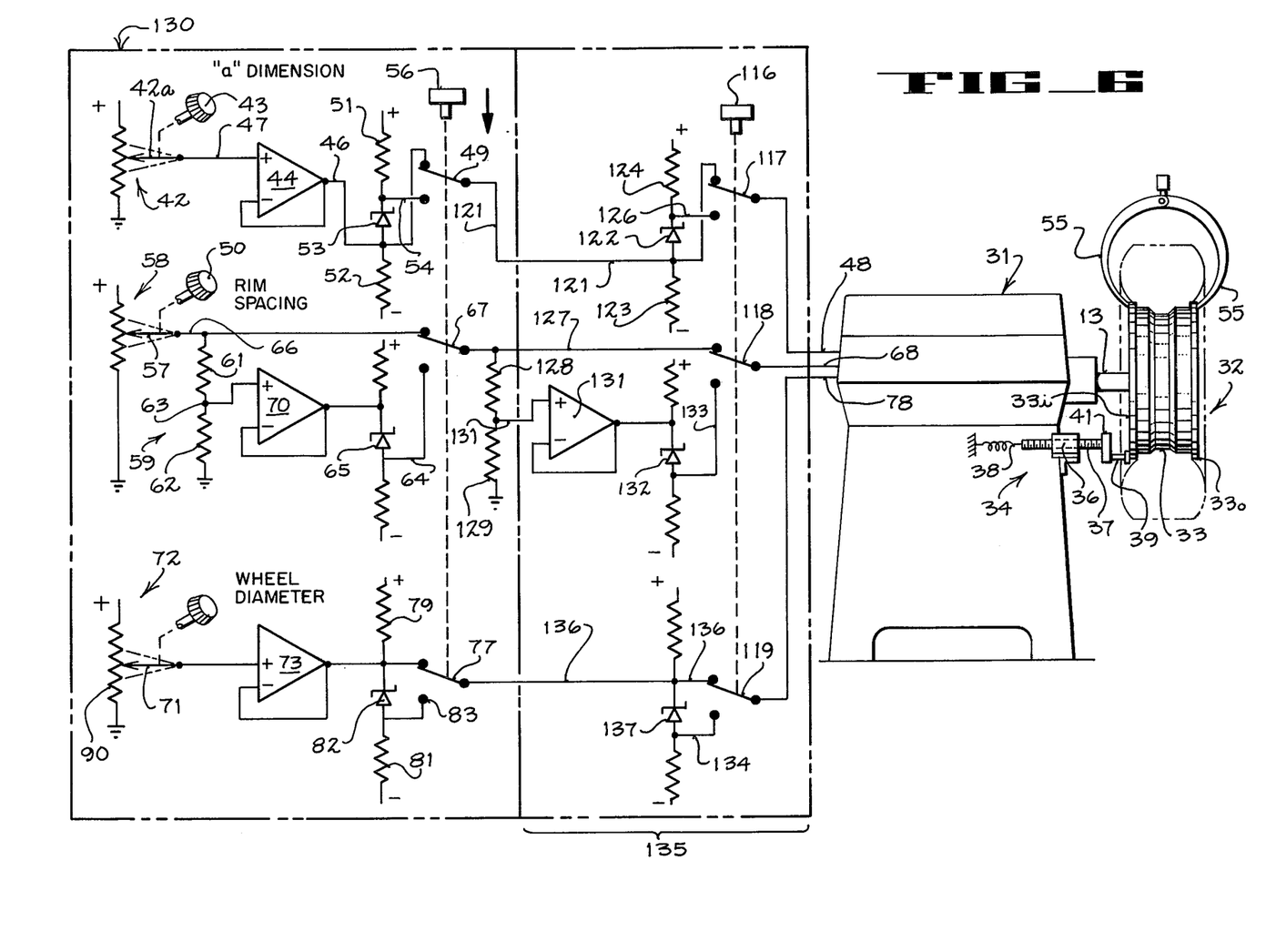
FIG. 5 shows a schematic block diagram of a system according to another embodiment of the invention.

According to another embodiment of the invention as shown in FIG. 5 means are provided whereby the balance weight is displayed as zero in balancing a "mag" wheel based upon determinations derived from information associated with the wheel but taken as though it were a steel wheel.

Thus, in the system as shown in FIG. 5 an information input system 178 serves to successively supply unmodified information into the computation and control section 179 of a balancing machine of the kind described previously, and then to supply modified information. The function of system 178, having been described previously, need not be repeated.

There is, however, one change in designation in system 178. For switches 49, 67 and 77, and "N" is associated with those switch points representing an unmodified input signal, i.e. "normal", and an "M" is associated with the other switch point so as to represent a "mag" input or modified input. This convention has also been carried over into system 180 as now to be described.

Computation and control section 179 includes suitable kown structure of a type employed in dynamic balancing machines for determining the location and amount of weight to be added to a rotating vehicle wheel.

The system 180 serves to display a zero weight when detecting values of weights which fall below a predetermined level. As noted above, the system also takes advantage of the ability to provide a zero weight display for a "mag" wheel by computing the amount of weight as though the "mag" wheel were a standard steel wheel.

As shown in FIG. 5 a start switch 181 is shown diagrammatically as spring-loaded from below to place both of its armatures 181a, 181b out of engagement with associated pairs of contacts. Armature 181a serves to couple an input lead 182 to a power supply via line 183 for starting the system. At the same time armature 181b joins that pair of contacts coupling power supply line 183 to a lead 184 for purposes of resetting a minimum weight register 186 to zero as described further below.

Accordingly, upon activating the system, the Q output of flip-flop 258 (FIG. 10) will initially be low to provide a low state on lead 187 in the mag control section 179a. Switches 49, 67, 77 are initially in their normal ("N") state until pulse 265 from section 257 operates flip-flop 258 to provide a positive state at the Q output for line 187 as now to be described.

Cycle control section 257 provides an "end cycle" pulse on lead 266 shortly before it generates a "normal display enable" signal via line 189. Signal 278 is also sensed on line 276. Thus, pulse 265 serves to "set" flip-flop 258 to switch the Q output to a positive state by means of a setting pulse supplied from the three input AND gate 267 coupled via line 269 and inverter 271 to flip-flop 258. The three positive inputs to AND gate 267 are derived (1) from switch armature 188d connected to the "mag" wheel contact "M", (2) the "end cycle" pulse 265 on lead 266, and (3) the low state of signal 278 inverted at 274 to a high state.

As diagrammatically shown in FIG. 5 a manual switch 188 having four discrete sections designated by an encircled letter A, B, C, D serves to simultaneously transfer all sections from the "N" to "M" contacts and vice verse. Thus, in the normal ("N") or steel wheel mode the armatures 188a–188d of switch 188 are similarly positioned to the normal ("N") contacts of sections A, B, C, D.

With switch 188 in the normal mode, the "normal display enable" output on lead 189 travels a path via the A section of switch 188, lead 191, and delay means 288 for thereafter enabling display 192.

Display 192 includes a first section 192b directly coupled via line 193 to computation and control section 179 for receiving information indicative of the position at which weight is to be added to a wheel being balanced.

It is to be observed that each of switch armatures 49, 67, 77 of the information input system 178 are disposed in a normal ("N") position whereby the information taken by the operator from measurements and observations of a wheel is directly supplied to the computation and control section 179. After computing the appropriate amount of weight to be added, an output as to the amount of weight required appears on lead 194. Lead 194, coupled to switch 196 in its normal or "steel wheel" position supplies this information to a weight register 197 for weight calculated as though the measurements were for a steel wheel, hence the designation "steel weight register". Register 197 temporarily stores the steel values for later comparison to a selected one of a plurality of predetermined minimum weights whereby should the amount in register 197 be less than the predetermined minimum weight with which it is compared the weight section 192a of display 192 will be instructed to show zero weight as described below. Otherwise, the value of the weight in steel weight register 197 will be displayed in the weight section 192a, if a steel wheel is being balanced.

Accordingly, a wheel diameter taken from potentiometer 72 via switch armature 77 in its normal position supplies an input via lead 78 to computation and control section 179. This same input is also directed via analog to digital convertor 198 to a temporary storage register 199 for holding information as to the diameter of the wheel being balanced.

A reference diameter register 201 maintains a predetermined value representative of a given wheel diameter whereby when the values in each of registers 199, 201 are compared by comparator 202 if the value in register 199 is less than the predetermined value of register 201 a value representative of a first minimum weight will be stored in a minimum weight register 186. As thus arranged a first predetermined minimum weight register 206 stores the value of a predetermined minimum weight to be coupled via lead 204 and switch armature 203a to register 186 when 199 is less than 201.

However, should the value of the information stored in register 199 be greater than the value of that stored in predetermined register 201 (thereby indicating a wheel of relatively large diameter) then comparator 202 serves to activate a controller 203 for transferring switch armature 203a to lead 207. This action serves to transfer the value of minimum weight stored in register 208 into minimum weight register 186 via switch armature 203a.

As noted above, the weight thus provided to register 186 is then later to be compared with the calculated weight maintained in register 197.

The "end cycle" signal 265 on line 266 (FIG. 10) represents completion of the computation of the unadjusted (steel wheel) information taken from each of the potentiometers without modification thereby computing the weight for the steel weight register 197 as noted above.

The first "end cycle" signal 265 is then fed back to "mag" wheel control section 179a from cycle control section 257 (FIG. 10). Section 179a then instructs section 179 to repeat its computations which will then occur in the event that the sections of switch 188 are disposed in their "mag" wheel positions. Otherwise 37 mag" wheel control section 179a remains inactive since armature 188d is connected to ground so as to inhibit AND gate 267 and preclude the initiation of a subsequent cycle of computation. With switch 188 in its mag wheel position the re-computation will not be inhibited.

In operation, assuming that the value of the diameter of the wheel as represented by the value stored in register 199 is less than the predetermined value stored in the register 201, the minimum weight will be transferred from register 206 to minimum weight register 186 for comparison with the value in steel weight register 197. Assuming that the calculated weight in register 197 is less than the minimum weight contained in register 186 then comparator 212 serves to activate a switch operator 213 to couple the switch armature 214 to a zero weight register 216 in which each position of the register maintains a value of zero. As thus connected the zero value in zero weight register 216 is transferred into the weight section 192a of display 192.

On the other hand in the event that the weight in steel weight register 197 is greater than that shown in register 186 then comparator 212 does not activate operator 213 and the output from register 197 is transmitted along a path defined by lead 217, switch armature 188b, lead 218, switch armature 214 and lead 219 so as to be displayed in the weight section 192a of display 192.

For those circumstances where a zero weight is displayed and the operator still wants to know the amount of the weight calculated, means for obtaining a read-out of these sub-minimum values of weights functions as follows:

By holding start switch 181 depressed for a period sufficient to permit a repeat calculation of the value of weight to be made under instruction of section 179a, a value will appear via line 195. A signal from section 257 representing the normal display enable state 278 will then appear on a path defined by lead 189, switch armature 188a, line 191, and line 221 leading to a NAND gate 222. As thus arranged, the continued holding of start button 181 down serves to couple a plus power supply via lead 184 to NAND gate 222 whereby along with the signal appearing on line 221 a negative going reset to zero state is supplied to register 186 via line 226. Having thus reset register 186 to zero any value whatever in excess of zero appearing in register 197 will then be greater than the value stated in register 186. Thus, the value of register 197 is transmitted via line 217, switch 188b, line 218, switch 214, and lead 219 to the weight section 192a for display at such time as display 192 has been enabled by the "normal" display enable signal 278 on line 189.

It is evident that display enable signal 278 from cycle control section 257 must be delayed sufficiently to permit the foregoing operations to occur before displaying the results in display 192. Accordingly, delay means 228 disposed in line 191 immediately ahead of display 192 provides such delay as is necessary.

Thus, the foregoing operation of system 180 pertains to balancing wheels using normal steel wheel input information.

However, when switch 188 has been moved so that each of its associated sections A-D are coupled to an associated contact designated "M" for "mag" wheels system 180 operates in a mag wheel mode as follows:

Computation and control section 179 makes a first calculation based on unmodified input information (i.e. with switches 49, 67, 77 in an "N" position). After such calculation, a signal via lead 187, 227 and control 228 serves to transfer all switches 49, 67, 77 to their "M" contacts. As noted above, when section 179a instructs sections 179 to repeat the calculation, the inputs will have been modified by the transfer of switches 49, 67, 77.

As a result of the "N" mode of operation noted above, switch 214 will not be coupled to zero register 216 in the event that the value in steel weight register 197 falls below the value of weight in minimum weight register 186.

The "end cycle" signal transmitted via line 266 to the "mag" wheel control section 179a causes the latter to direct section 179 to repeat its calculation. Thus, the repeated calculation will occur after control 229 has transferred switches 49, 67, 77 so that the second calculation will employ the modified input information from system 178. At the end of the second or recalculation procedure a "second calculation done" signal appears on lead 231 (FIGS. 5 and 10). The signal on lead 231 is now transferred via switch armature 188a to the enable line 191 thereby enabling display 192 following the delay of means 238. This same signal via line 235 gates information as to computed weight from lead 194 via switch 196 and line 232 into "mag" weight register 233.

The previous activation of control 229 operated switch 196 to transfer to the "M" terminal associated therewith so that the weight computed by section 179 will be transmitted via lead 232 to a "mag" wheel weight register 233 for storing the computed weight based on the modified input information.

The value of the weight stored in register 233 is supplied to the weight section 192a of display 192 via a path including switch armature 188b (now in the M position), lead 218, switch armature 214, and lead 219 unless, of course, switch 214 has been coupled to the zero register 216 as the result of the earlier comparison between the values in registers 197 and 186 using ¢steel wheel" inputs for the "mag" wheel being balanced.

A system 200 as shown in FIG. 9 automatically modifies the input information obtained by the operator of the system with respect to the three parameters noted. Information is modified for a selected one of a plurality of classes of "mag" wheels as well as for the balancing of standard steel wheels.

System 200 contains a number of components as previously described with respect to system 180 shown in FIG. 5. Accordingly, in the interest of brevity, the following numbering convention is used in FIG. 9. A third order digit "3" is employed with the first and second order digits of each of the reference numbers appearing in FIG. 5 and FIG. 10 to indicate a similar structure and function. Thus, for example, NAND gate 222 in FIG. 5 is designated 322 in system 200 of FIG. 9. Also, input lead 68 in FIG. 5 is designated 368 in FIG. 9.

Briefly, system 200 employs a pair of control elements 388, 236 for respectively designating either "mag" or normal wheel balance conditions and means for selecting one of a plurality of classes of "mag" wheels to be balanced. Accordingly, a manual control represented by the push button 388 when pressed serves to transfer switch armature 388a for the A section of the switch from the normal ("N") position to the "mag" wheel ("M") position. At the same time manual control 388 serves to transfer the B, C and D sections of the same switch from normal to "mag" wheel positions.

Means for effecting a selection of one of a plurality of modifications to be made to the input information so as to adjust the input for a selected class of "mag" wheel is shown by the manually operated element 236 ganged together with a plurality of three switch armatures 237, 238 and 239. Armatures 237-239 are respectively movable between first and second positions for selectively supplying an input signal to computation and control section 279 so as to apply a first or second modification to the input signal.

Thus, for example, with respect to the input parameter representative of wheel diameter selective positioning of wiper 371 of potentiometer 372 serves to supply an unmodified input to the normal ("N") (steel wheel) contact point 240 for switch 377 via lead 241 and operational amplifier 373.

In the event that control 329 has been activated in order to transfer switch armature 377 to the "mag" wheel ("M") points associated with switches 349, 367 and 377 the wheel diameter input signal will be modified by the presence of zener diode 242 with switch 239 in the position shown. As thus arranged zener diode 242 provides a voltage drop between the voltage as it appears on lead 241 and as it appears on lead 243. Thus, the signal on lead 243 is transmitted through switch armature 239 to the "mag" wheel lead 244. The reduced voltage will then be supplied to section 379 as an input via lead 378 with a branch directing the modified voltage to diameter register 399 via the analog to digital converter 398.

In the event that the "mag" wheel being balanced falls in a different class, push button 236 can be depressed to transfer its associated armatures 237, 238 and 239 to a different switch contact point representing a different class of "mag" wheel to be balanced. As shown, the upper contacts pertain to a first class of "mag" wheel and the lower contacts pertain to a second class.

Accordingly, by depressing push button 236 the path for an electrical signal representing input information associated with wheel diameter will be directed along a path defined by a first and second zener diode 242, 245 which further reduces the voltage of the input signal to appear on output lead 246. Accordingly, this additionally modified input signal for wheel diameter will be sensed by line 244 and directed to computation and control section 379 along a path defined by the "mag" wheel contact point of switch 377, and input lead 378.

In parallel with the input lead 378 the modified input signal is supplied to diameter register 399 via analog to digital converter 398 for comparison with the value of a predetermined diameter. As noted above when the value in register 399 is less than that in register 301 a first value of predetermined minimum weight from register 306 is read out into the minimum weight register 386 via path 304. When the value in register 399 is greater than in 301 a second predetermined value of minimum weight is read out from register 308 to register 386 under the action of comparator 302.

In order to effect a selected modification of the "a" dimension with respect to different classes of "mag" wheels, the "a" dimension input signal established by potentiometer 342 appears undiminished at the normal or steel wheel contact "N" of switch 349 via lead 346. However, when switch 349 has been set for "mag" wheels, a first modification of the input signal is provided by the presence of zener diode 247 arranged in a manner whereby the output at 248 is stepped up from the value appearing on lead 346 whereby via line 249 the modified signal appears as modified in accordance with a class 1 "mag" wheel. This modified signal is transmitted via switch armature 237, input lead 354, switch 349 (when coupled to the "mag" wheel contact point) and line 348 leading into section 379.

With respect to the "a" dimension when it is desired to add an additional modification to the signal, as occurs in balancing a second class of "mag" wheels, push button 236 is merely depressed to the point where switch 237 engages the switch contact point from lead 251 associated with the class 2 "mag" wheels. Thus, by passing the signal from line 346 upwardly through zener 247 and zener 252 the output on line 251 is modified by both a first and a second stage.

With the rim spacing parameter, a similar modification of the input information signal is made to accommodate the selection of one of a plurality of classes of "mag" wheels to be balanced. Accordingly, it is to be noted that switch armature 238 moves between retracted and advanced positions for introducing specific reductions in voltage to the input line 368 by passing the input signals through either one or the other of the two zener diodes 253, 254.

As thus arranged system 200 shown in FIG. 9 makes it relatively easy for an operator to balance "mag" wheels of different classes as well as steel wheels.

Briefly, in operation the operator will depress button 388 so as to eastablish a "mag" wheel condition for the system by transferring each of the four sections A-D associated with switch 388 to their respective "M" contacts. Thus, after calculating the results for a steel wheel, the "input switch transfer" signal via output lead 387, activates control 329 to transfer each of switch armatures 349, 367, 377.

In addition to operating the push button 388 the operator also depresses a button 236 if he desires to select a class 2 "mag" wheel. In the event that he desires to balance a conventional "mag" wheel the push button 236 does not need to be operated.

From the foregoing it should be readily evident that there has been provided an improved wheel balancing system for properly balancing both steel and "mag" wheels with relative ease using substantially the same system and operator procedures for both.

Furthermore, it is to be noted that from the foregoing system the minimum amount of weight to provide an effective balancing for a steel wheel is employed to provide a zero read-out of weight in conjunction with balancing a "mag" wheel thereby avoiding an exceedingly difficult and usually impractical routine for balancing the "mag" wheel.

Notwithstanding the zero read-out the operator can in fact obtain the actual weight calculated (even though it lies below the predetermined minimum level of weight). Thus, by simply holding down the start button for a short period provides an override of the zero weight read-out.

Mag wheel control section 179a referred to in FIG. 5 (and the related section 379a of FIG. 9) is shown in more particular detail in FIG. 10 as now to be described.

Start button 181 initiates a signal to the cycle control section 257 via the OR gate 256 thereby initiating the sensing and computation cycle in accordance with known balancing machine procedures.

Means providing a signal on lead 187 for switching the state of the input switches includes the "Q" output of a first flip-flop 258. Means providing a "second calculation done" signal on lead 231 includes the "Q" output of a second flip-flop 259.

The initial start pulse via lead 182, 261 and the one-shot 262 also serves to reset each of flip-flops 258, 259. The one-shot 262 provides a short negative going pulse to the reset terminal of flip-flops 258 and 259 to prevent the prolonged holding down of start button 181 from keeping flip-flops 258, 259 in a reset state.

Cycle control section 257 serves to generate end-of-cycle pulses 265,275 onto line 266. A "normal display enable" state of signal 278 is generated onto lead 189 for purposes of enabling display 192a. The foregoing signals appearing on leads 266 and 189 occur upon completion of the first calculation.

When the system has been switched to a "mag" wheel mode by transfer of switch 188, a second start pulse is directed to cycle control section 257 via the other input 268 to OR gate 256. The start pulse appears on lead 268 in a manner described further below with respect to the operation of the three input AND gate 267. The output of gate 267 (i.e. second start pulse) also serves to set flip-flop 258 by a pulse traveling from AND gate 267 along a path defined by lead 269 and inverter 271 to provide a negative going pulse thereto. The action of setting flip-flop 258 serves to provide a "Q" output to activate control 299 for transferring each of the switche armatures 77, 67 and 49 from their normal ("N") contact points to their "mag" wheel ("M") contact points.

Accordingly, all inputs to computation and control section 179 will then be converted to the modified inputs associated with "mag" wheels.

The next subsequent end-of-cycle pulse 275 passes via NAND gate 272 since the normal ("N") display enable signal 278 is now high (on leads 189 and 276) and sets flip-flop 259 via line 281. This condition creates a "second calculation done" signal appearing on output 231 from flip-flop 259.

It is to be observed that no further start cycle pulses can be directed to cycle control section 257 during the existence of signal 278 since the three input AND gate 267 remains blocked by the presence of the negative input from inverter 274.

As thus arranged the computation and control section 179 of the wheel balancing machine is directed to repeat a calculation only once based on the input information which it receives. Accordingly, cycle control section 257 receives a first start cycle pulse from the start switch 181 as noted and a second start cycle pulse via lead 268 is later provided as now to be described. Further, a "second calculation done" state appears on output 231 of flip-flop 259 in the manner noted below.

Thus, in operation in response to generating a start cycle pulse by means of switch 181, cycle control section 257 initiates a normal cycle and provides the first end cycle pulse 265 on line 266 when the cycle is complete.

In order to provide a subsequent start cycle pulse to section 257 a branch 270 connects lead 266 to AND gate 267. A second one of the three inputs to AND gate 267 is supplied by switch 188 in its "mag" wheel mode whereby the "D" section i.e. armature 188d is transferred to the "M" contact to couple a plus power supply to AND gate 267. Accordingly, just before the normal display enable signal 278 on line 189 goes high (after the first end cycle pulse 265 occurs), inverter 274 provides a high input state on lead 279. Thus, upon occurrence of the first end cycle pulse 265 appearing on line 266 from section 257 all three inputs to AND gate 267 will then be positive and provide a start cycle pulse via lead 268 to OR gate 256 to initiate the second cycle and also to set flip-flop 258 through inverter 271 thereby altering the values of the inputs to the system from normal to "mag" inputs.

At the end of the second cycle, a second end cycle pulse 275 occurs at line 266. This positive going pulse is transmitted via lead 266 to NAND gate 272 whereby upon the occurrence of the normal display enable state 278 from cycle control section 257, NAND gate 272 will receive a second positive signal for gating through an inverted signal for setting flip-flop 259 thereby enabling display 192 (FIG. 5) after completing the second computation.

From the foregoing it will be readily evident that types of rotatable bodies other than vehicle wheels can also be balanced according to the teaching of the invention described and claimed herein.

We claim:

1. In a wheel balancing system for computing the amount of counterbalancing weight to be added in each of two spaced parallel planes taken through said weights and defined by rotation of said weights with a dynamically unbalanced wheel, variable means controllable by an operator for providing a first input signal substantially representative of the spacing between the rims of the wheel, means for adjusting the value of said first signal by a predetermined relationship to provide a second input signal substantially representative of a spacing between said planes different from the first named spacing, and means for selectively coupling said first or second input signals to said system for computing the value of weights to be added in the first or second named spaced parallel planes.

2. In a wheel balancing system for computing the amount of counterbalancing weight to be added in each of two spaced parallel planes taken through said weights and defined by rotation of said weights with a dynamically unbalanced wheel, variable means controllable by an operator for providing a first input signal substantially representative of the diameter of the rims of the wheel, means for adjusting the value of said first signal by a predetermined relationship to provide a second input signal substantially representative of the diameter of the rotational path of weights carried by a wheel to be balanced, the last named diameter being different from the first named diameter, and means for selectively coupling said first or second input signals to said system for computing the value of weights to be added to travel a rotational path having the first or second named diameter.

3. In a wheel balancing system for computing the amount of counterbalancing weight to be added in each of two spaced parallel planes taken through said weights and defined by rotation of said weights with a dynamically unbalanced wheel, variable means controllable by an operator for providing a first input signal substantially representative of a moment arm defined between the inner rim of a wheel carried on an axle and the nearest point of support defined between the axle and the balancing system for said axle carried by the balancing system, means for adjusting the value of said first signal by a predetermined relationship to provide a second input signal substantially representative of a moment arm having an extent different from the first named moment arm, and means for selectively coupling said first or second input signals to said system for computing the value of weights to be added in the first or second named spaced parallel planes.

4. In a wheel balancing system of a type for computing the amount of counterbalancing weight to be added to a wheel in each of two spaced parallel planes defined by rotation of the weights with the wheel, a plurality of variable input means for providing signals representative of the value of input information relative to the rotational paths of weights to be carried by the wheel when said input information is derived in a predetermined manner for a first style of wheel, and means for selectively modifying said signals by a predetermined relationship to become representative of different values of input information relative to the rotational paths of weights carried by a different style of wheel, the last named information being obtained in the same said predetermined manner though relative to a second and different style of wheel.

5. In a wheel balancing system of a type for computing the amount of counterbalancing weight to be added to a wheel in each of two spaced parallel planes defined by rotation of the weights with the wheel, variable inputs means for providing signals representative of the spacing between said planes and corresponding substantially to the spacing between rims of a first style of wheel, and means selectively operable for modifying said signals by a predetermined relationship to be representative of spacing between said planes for a second style of wheel in which the spacing between said planes has a value different from the spacing between said rims though based upon measurement of the spacing between said rims.

6. In a wheel balancing system according to claim 4 comprising means for converting the first named input signals to digital signals.

7. In a wheel balancing system of a type for computing the amount of counterbalancing weight to be added to a wheel in each of two spaced parallel planes defined by rotation of the weights with the wheel, variable input means for providing a first input signal substantially representative of the value of one of a plurality of wheel balancing parameters as pertains to a first style of wheel, and means for selectively modifying said input signals by a predetermined relationship to become a representative of the value of said parameter for another style of wheel.

8. In a wheel balancing system according to claim 7 in which the last named means comprises means for selectively modifying said input signal to become representative of the value of said parameter for a selected one of a plurality of other classes of wheels.

9. In a wheel balancing system according to claim 8 wherein the last named means includes a plurality of control elements for modifying an input signal in response thereto for each parameter to provide a plurality of modifications to each said input signal.

10. In a wheel balancing system according to claim 8 wherein the last named means includes a single control element for a given parameter to modify an input signal in response thereto for providing a plurality of modifications to each said input signal.

11. In a wheel balancing system according to claim 8 wherein the last named means includes means for selectively modifying an input signal for each parameter in stages in response to sequential operation thereof.

12. In a wheel balancing system of a type for computing the amount of counterbalancing weight to be added to a wheel in each of two spaced parallel planes defined by rotation of the weights with the wheel, apparatus comprising means defining a first predetermined minimum weight level, and means defining a second predetermined minimum weight level, means for activating one of the first or second named means in response to the value of an input signal representative of one of a plurality of parameters used by said balancing machine to compute the weight to be added, means for comparing the computed value of weight to be added with the selected one of said predetermined minimum weight levels to detect whether the computed weight is higher or lower than the predetermined weight, means for displaying the computed weight, and means for displaying zero weight in the last named means in response to detecting the computed weight to be less than the selected predetermined weight.

13. In a wheel balancing system of a type for computing the amount of counterbalancing weight to be added to a wheel in each of two spaced parallel planes defined by rotation of the weights with the wheel, apparatus comprising means defining a predetermined minimum weight level in response to the value of an input signal representative of one of a plurality of parameters used by said balancing machine to compute the weight to be added, means for comparing the computed value of weight with the predetermined minimum weight level to detect whether the value of the computed weight is lower than that of the predetermined weight, means for displaying the computed weight, means displaying zero weight in the last named means in response to detecting the computed weight to be less than the predetermined weight.

14. In a wheel balancing system according to claim 13 comprising means for over-riding the last named means for displaying the computed weight even though less than said predetermined weight.

15. In a wheel balancing system of a type for computing the amount of counterbalancing weight to be added to a wheel in each of two spaced parallel planes defined by rotation of the weights with the wheel, apparatus comprising means defining a predetermined minimum weight in response to the value of an input signal representative of one of a plurality of parameters used by said balancing machine to compute the weight to be added to a first cycle of wheel, means for comparing the computed value of weight with said predetermined minimum weight to detect whether the value of the computed weight is lower than that of said predetermined weight, means for displaying the computed weight, means for displaying zero weight in the last named means for a second style of wheel in response to detecting the weight computed for said first style of wheel to be less than said predetermined weight.

16. In a wheel balancing system of a type for computing the amount of counterbalancing weight to be added to a wheel in each of two spaced parallel planes defined by rotation of the weights with the wheel, apparatus comprising means defining a predetermined minimum practical value of weight to be added to a first style of wheel in response to the value of an input signal representative of one of a plurality of parameters used by said balancing machine to compute the weight to be added to the wheel, means selectively operable between first and second states thereof for conditioning the system to function with respect to first and second styles of wheels, said system including an information input system for receiving information relative to a plurality of parameters for balancing a wheel, and a balancing machine having a computation and control section serving to compute weight to be added to a wheel based on the values of the input parameters, means for causing said section to successively compute weight to be added, means for successively coupling the computation and control section of said balancing machine to receive input information relative to a first style of wheel and then to input information modified to be made relative to a second style of wheel, said balancing machine serving to compute weight to be added to said first style of wheel and to said second style of wheel, means for comparing the computed value of weight for said first style of wheel with said predetermined weight to detect whether the value of the computed weight for said first style of wheel is greater than that of said predetermined weight, means for displaying the computed weight of a wheel being balanced, and means coupled to operate the last named means to display zero weight in response to detecting the weight of said first style of wheel to be less than said predetermined weight.

17. In a wheel balancing system of a type having sensor means disposed in spaced apart planes for computing the amount of counterbalancing weight to be added in each of two spaced parallel planes taken through said weights and defined by rotation of said weights with a dynamically unbalanced wheel, variable means controllable by an operator for providing a first input signal substantially representative of a moment arm defined between a reference plane in a wheel carried on an axle and a reference plane spaced parallel to the last named plane and taken through a point of support for said axle carried by the balancing system, means for adjusting the value of said first signal by a predetermined relationship to provide a second input signal substantially representative of a moment arm having an extent different from the first named moment arm, and means for selectively coupling said first or second input signals to said system for computing the value of weights to be added in the first or second named spaced parallel planes.

* * * * *